(12) United States Patent
Kim et al.

(10) Patent No.: US 11,230,177 B2
(45) Date of Patent: Jan. 25, 2022

(54) BATTERY SYSTEM OF VEHICLE

(71) Applicants: HYUNDAI MOTOR COMPANY, Seoul (KR); KIA MOTORS CORPORATION, Seoul (KR)

(72) Inventors: Byung Su Kim, Incheon (KR); Jun Seok Choi, Hwaseong-si (KR); Jin Won Kim, Pyeongtaek-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 108 days.

(21) Appl. No.: 16/882,736

(22) Filed: May 25, 2020

(65) Prior Publication Data
US 2021/0146764 A1     May 20, 2021

(30) Foreign Application Priority Data
Nov. 14, 2019  (KR) .......................... 10-2019-0146147

(51) Int. Cl.
| | | |
|---|---|---|
| *B60K 1/00* | (2006.01) | |
| *B60K 1/04* | (2019.01) | |
| *B60L 58/26* | (2019.01) | |
| *B60L 50/60* | (2019.01) | |
| *B60K 6/28* | (2007.10) | |

(52) U.S. Cl.
CPC ............... *B60K 1/04* (2013.01); *B60L 58/26* (2019.02); *B60K 6/28* (2013.01); *B60K 2001/005* (2013.01); *B60K 2001/0433* (2013.01); *B60L 50/66* (2019.02); *B60Y 2200/91* (2013.01); *B60Y 2200/92* (2013.01); *B60Y 2306/05* (2013.01)

(58) Field of Classification Search
CPC ...... B60K 1/04; B60K 6/28; B60K 2001/005; B60L 58/26; B60L 50/66; B60Y 2200/91; B60Y 2200/92
See application file for complete search history.

(56) References Cited

U.S. PATENT DOCUMENTS

| | | | | |
|---|---|---|---|---|
| 6,094,927 A | * | 8/2000 | Anazawa | ................ B60L 58/26 62/239 |
| 7,143,724 B2 | * | 12/2006 | Hashizumi | .............. B60L 1/003 123/41.56 |
| 7,511,455 B2 | * | 3/2009 | Yoneda | ................... B60L 50/64 320/112 |

(Continued)

FOREIGN PATENT DOCUMENTS

KR      10-0783895 B1     12/2007

*Primary Examiner* — Hau V Phan
(74) *Attorney, Agent, or Firm* — McDonnell Boehnen Hulbert & Berghoff LLP (57) ABSTRACT

A battery system of a vehicle is provided and includes a battery module assembly (BMA) formed by overlapping a plurality of battery modules along a first direction, a cooling fan installed to be aligned along the first direction on one side of the BMA and configured to discharge air cooling the BMA while passing therethrough, a low voltage battery installed to be aligned along the first direction on the other side of the BMA, a power relay assembly (PRA) aligned along a second direction perpendicular to the first direction and installed adjacent to the low voltage battery, and a battery management system (BMS) aligned along a third direction perpendicular to the first direction and the second direction and installed adjacent to the low voltage battery and the PRA.

11 Claims, 10 Drawing Sheets

(56) References Cited

U.S. PATENT DOCUMENTS

| | | | |
|---|---|---|---|
| 7,631,711 B2* | 12/2009 | Kubo | B60L 3/0053 |
| | | | 180/68.1 |
| 7,654,351 B2* | 2/2010 | Koike | B60L 50/66 |
| | | | 180/68.5 |
| 8,701,810 B2* | 4/2014 | Marukawa | H01M 10/613 |
| | | | 180/68.1 |
| 9,385,405 B2* | 7/2016 | Murata | H01M 10/613 |
| 10,000,138 B2* | 6/2018 | Tanaka | B60K 6/28 |
| 10,096,872 B2* | 10/2018 | Nakano | H01M 10/6563 |
| 2009/0167077 A1* | 7/2009 | Tsuchiya | B60L 50/60 |
| | | | 307/9.1 |
| 2011/0300421 A1* | 12/2011 | Iritani | H01M 10/6557 |
| | | | 429/72 |
| 2012/0318591 A1* | 12/2012 | Lim | B60K 1/04 |
| | | | 180/65.31 |
| 2013/0149583 A1* | 6/2013 | Kurita | H01M 10/6566 |
| | | | 429/120 |
| 2015/0037633 A1* | 2/2015 | Akiyama | H01M 10/6566 |
| | | | 429/83 |
| 2015/0340745 A1* | 11/2015 | Inoue | H01M 10/625 |
| | | | 429/120 |
| 2017/0106718 A1* | 4/2017 | Nakano | B60H 1/00028 |
| 2019/0081296 A1* | 3/2019 | Takahashi | H01M 10/613 |

* cited by examiner

BATTERY SYSTEM OF VEHICLE

CROSS REFERENCE TO RELATED APPLICATION

The present application claims priority to Korean Patent Application No. 10-2019-0146147, filed Nov. 14, 2019, the entire contents of which is incorporated herein for all purposes by this reference.

BACKGROUND

1. Technical Field

The present disclosure relates to a battery system of a vehicle, and more particularly, to a technology for mounting a battery system including a high voltage battery on a vehicle, the battery system being mounted on an electric vehicle or a hybrid vehicle.

2. Description of the Related Art

An electric vehicle or a hybrid vehicle needs to be equipped with a battery system including a high voltage battery thereon. Such a battery system has a relatively large volume and requires water-tightness. Thus, various attempts have been made to secure a position and a space for mounting the battery system. In some cases, the above-described battery system is mounted under a second row seat (rear seat) of the vehicle.

The above-described battery system includes a battery module assembly (BMA) comprising the high voltage battery, a power relay assembly (PRA), a battery management system (BMS), and a cooling device for cooling the BMA.

The contents described as the related art have been provided only to assist in understanding the background of the present disclosure and should not be considered as corresponding to the related art known to those having ordinary skill in the art.

SUMMARY

An object of the present disclosure is to provide a battery system of a vehicle having simple and compact configuration, capable of improving spatial efficiency in a vehicle body, reducing necessary material costs and a weight, securing effective and uniform performance in cooling the BMA, preventing introduction of noise into the vehicle through a cooling path, and preventing a sub-marine phenomenon of an occupant on a rear seat.

According to an embodiment of the present disclosure, a battery system of a vehicle includes: a battery module assembly (BMA) formed by overlapping a plurality of battery modules along a first direction; a cooling fan installed to be aligned along the first direction on one side of the BMA and configured to discharge air cooling the BMA while passing therethrough; a low voltage battery installed to be aligned along the first direction on the other side of the BMA; a power relay assembly (PRA) aligned along a second direction perpendicular to the first direction and installed adjacent to the low voltage battery; and a battery management system (BMS) aligned along a third direction perpendicular to the first direction and the second direction and installed adjacent to the low voltage battery and the PRA.

A PRA mounting bracket may be installed between the low voltage battery and the PRA and configured to support the PRA independently of the low voltage battery.

The battery system may be mounted under a rear seat of the vehicle, under the following conditions: the first direction is a transverse direction of the vehicle, the second direction is a height direction of the vehicle, and the third direction is a longitudinal direction of the vehicle.

An inlet duct may be provided above the BMA to introduce the air from a lower side of the center of the rear seat, an upper duct may be provided below the inlet duct and inclined downwardly toward the cooling fan from a duct hole, to which the inlet duct is connected, to uniformly supply the introduced air above each battery cell of the BMA, and a lower duct may be provided below the BMA to guide the air having passed through each of the battery cells to be directed to the cooling fan.

The PRA may be installed at a location that is physically blocked from a flow path of the cooling air connected from the inlet duct through the upper duct and the lower duct to the cooling fan.

A lower side of the battery system and a rear side of a vehicle body may be covered by a base plate, and an upper side of the battery system and a front side of the vehicle body may be covered by an upper cover.

The upper cover may include a first upper cover covering the BMA, and a second upper cover covering the BMS and the PRA.

According to another embodiment of the present disclosure, a structure for fixing the battery system as described above to a vehicle includes: a battery frame installed on an upper side of the upper cover to fix the battery system to the vehicle body; and a battery frame panel provided with the battery frame at a position for supporting occupant's buttocks on the rear seat from a lower side thereof.

The battery frame panel may be installed only from a center portion to a rear side of the battery frame.

At least one bolt for fixing the battery frame to the vehicle body may be an earth bolt, and the earth bolt may be fastened to electrically connect the base plate to the vehicle body.

A weld nut may be mounted on a lower side of a vehicle body panel at a portion where the earth bolt is fastened, a rigidity reinforcing member, the base plate, the upper cover and the battery frame may be sequentially stacked on an upper side of the vehicle body panel, and the earth bolt may be fastened to the weld nut after penetrating sequentially from an upper side of the battery frame.

DETAILED DESCRIPTION OF THE EMBODIMENTS

Referring to FIGS. 1 to 10, a battery system of a vehicle according to an embodiment of the present disclosure includes a battery module assembly (BMA) 1 formed by overlapping a plurality of battery modules along a first direction A1; a cooling fan 3 installed to be aligned along the first direction A1 on one side of the BMA 1 and configured to discharge air cooling the BMA 1 while passing therethrough; a low voltage battery 5 installed to be aligned along the first direction A1 on the other side of the BMA 1; a power relay assembly (PRA) 7 aligned along a second direction A2 perpendicular to the first direction A1 and installed adjacent to the low voltage battery 5; and a battery management system (BMS) 9 aligned along a third direction A3 perpendicular to the first direction A1 and the second direction A2 and installed adjacent to the low voltage battery 5 and the PRA 7.

Figure 1:
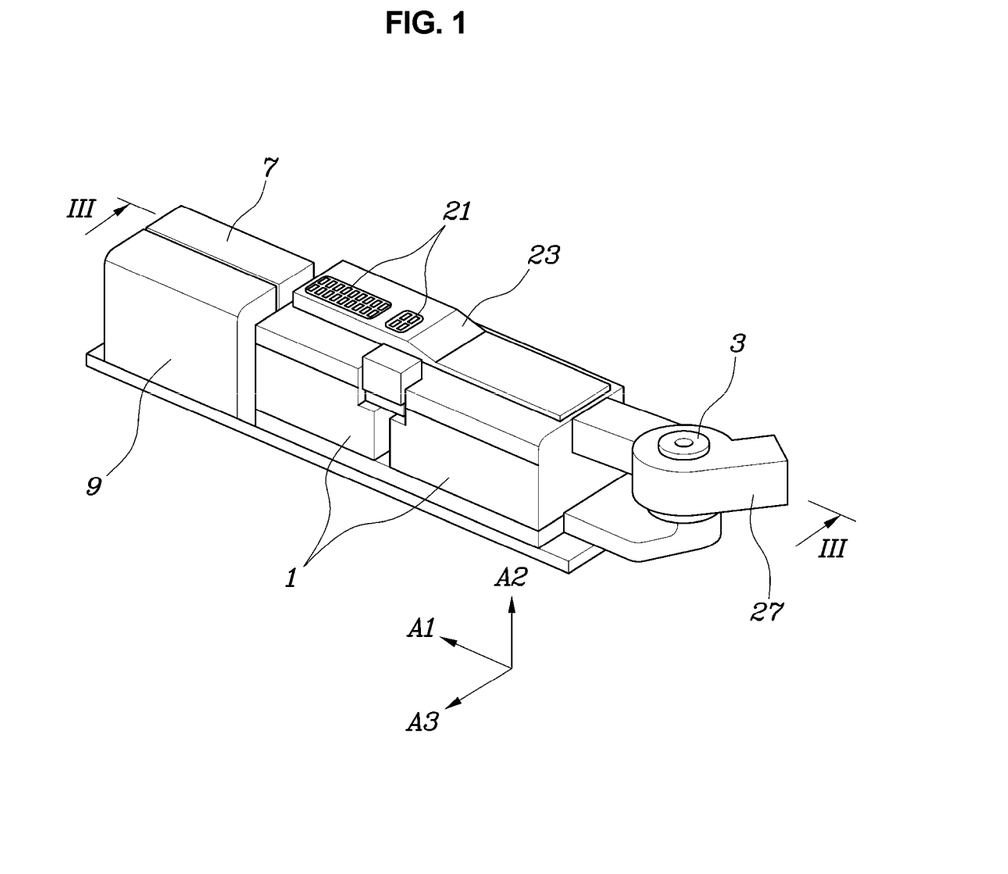
FIG. 1 is a view illustrating a battery system of a vehicle according to the present disclosure.

That is, in the battery system according to the embodiment, on the basis of FIG. 1, the BMA 1 and the cooling fan 3 are positioned on the right side, and the low voltage battery 5, the PRA 7, and the BMS 9 are positioned on the left side. As will be described below, a flow path of the cooling air communicating with the inside of the vehicle for cooling the BMA 1 is formed in such a manner that the air passes only through the BMA 1 and the cooling fan 3 so as to be physically isolated from the PRA 7, thereby structurally preventing introduction of noise generated from the PRA 7 into the vehicle.

The low voltage battery 5, which is a 12V battery for replacing a conventional lead storage battery for driving electronics in a vehicle, may be made of battery cells that are the same as or similar to those constituting the BMA 1. A ground thereof is formed on a base plate 11, which will be described below, so that a ground of a vehicle body may naturally be implemented by fixing the battery system according to the present disclosure to the vehicle body by means of an earth bolt 13.

Figure 5:
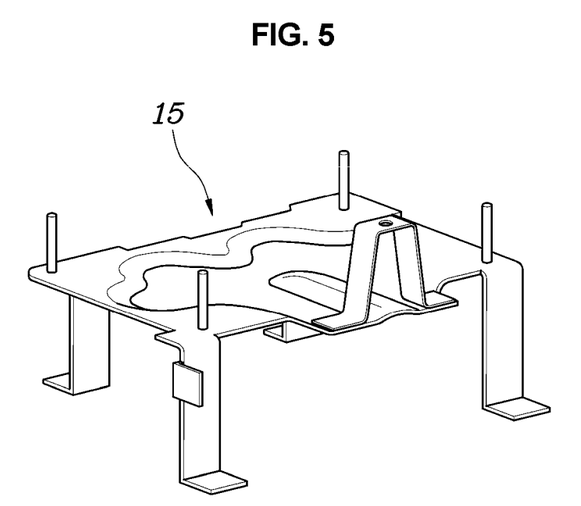
FIG. 5 is a view illustrating a PRA mounting bracket of FIG. 4.

As illustrated in FIG. 5, a PRA mounting bracket 15 is installed between the low voltage battery 5 and the PRA 7 and configured to support the PRA 7 independently of the low voltage battery 5.

That is, legs of the PRA mounting bracket 15 are fixed to the base plate 11, so that the low voltage battery 5 may be mounted between the base plate 11 and the PRA mounting bracket 15, and the PRA 7 may be fixed above the low voltage battery 5. As a result, the PRA 7 is configured to be independently supported by the base plate 11 in an electrically and structurally isolated state from the low voltage battery 5 in the vertical direction.

The battery system may be mounted under a rear seat of the vehicle, under the following conditions: the first direction A1 is a transverse direction of the vehicle, the second direction A2 is a height direction of the vehicle, and the third direction A3 is a longitudinal direction of the vehicle.

Figure 7:
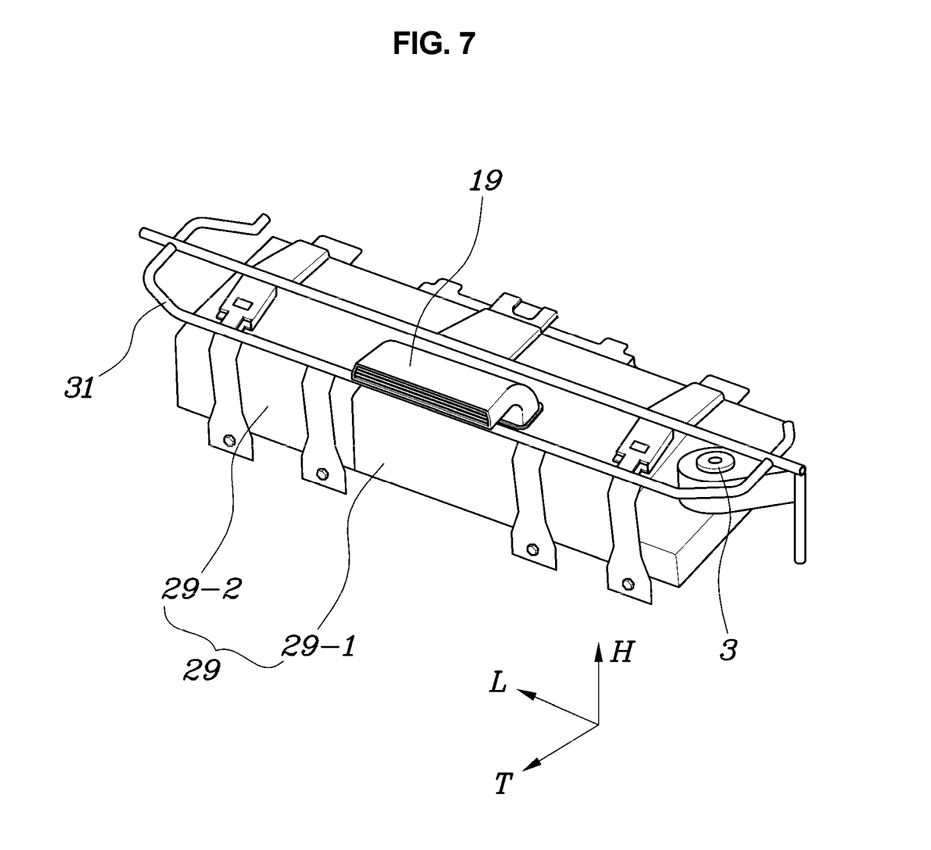
FIG. 7 is a view illustrating a state where a battery system according to the present disclosure is mounted on a vehicle body.
Figure 10:
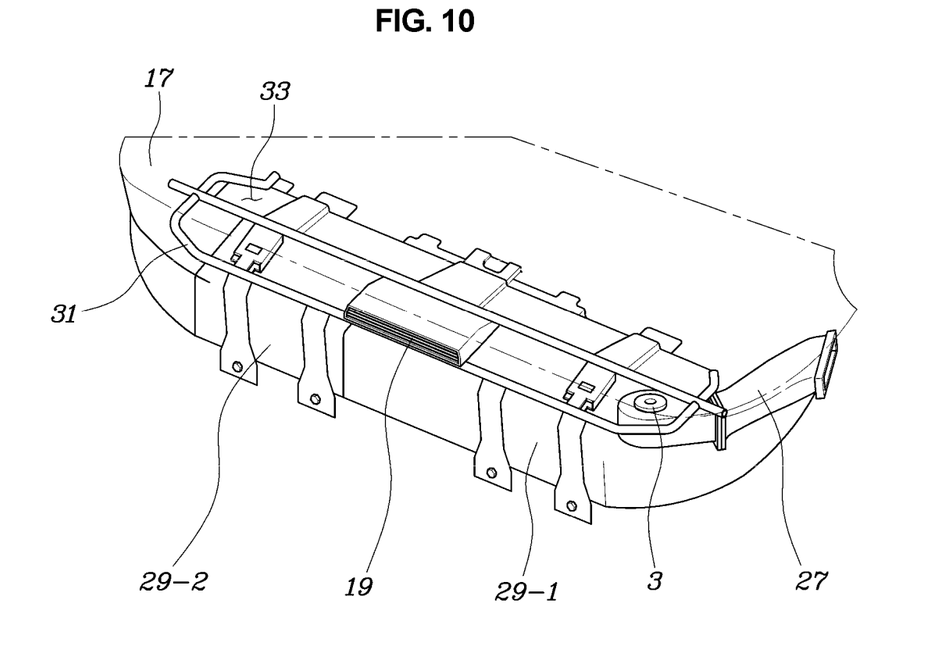
FIG. 10 is a view illustrating a state where a rear seat is mounted on an upper side of the battery system mounted on the vehicle body as in FIG. 7.

That is, as illustrated in FIGS. 7 and 10, the battery system may be mounted under the condition that an orthogonal coordinate system is formed such that the first direction A1, the second direction A2, and the third direction A3 of the battery system correspond to L, H and T directions of the vehicle body, respectively.

Hereinafter, the present disclosure will be described with reference to an embodiment in which the battery system is mounted on the vehicle body based on the above-described directions.

Figure 3:
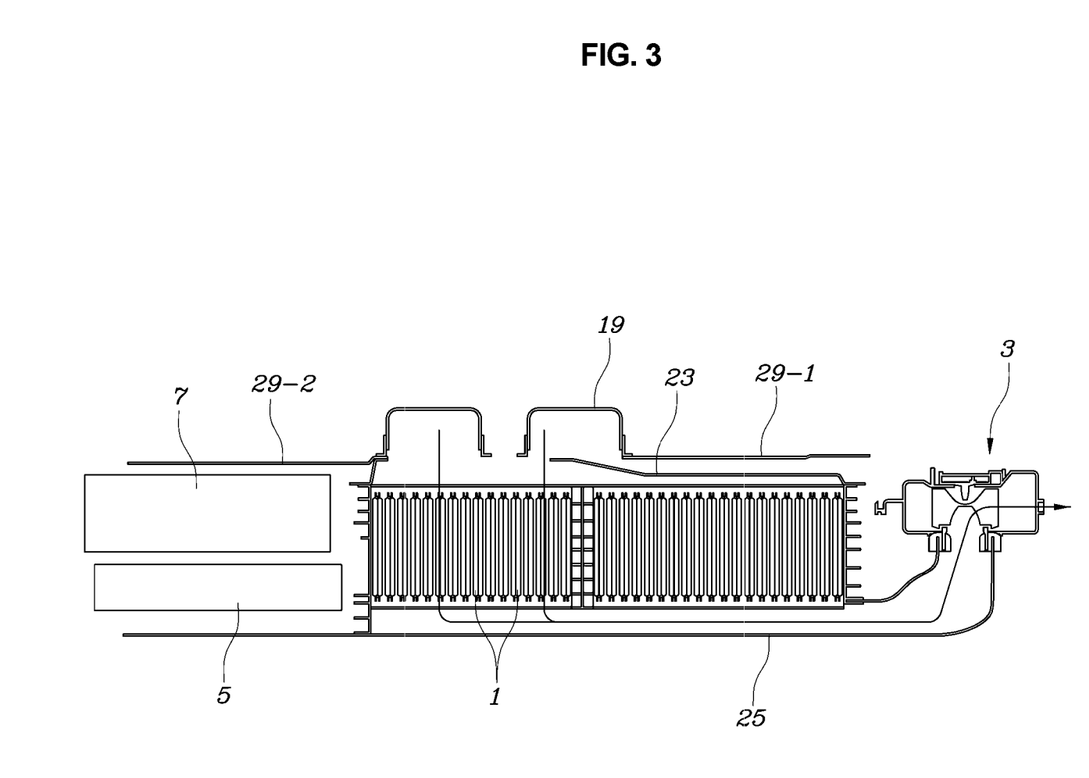
FIG. 3 is a cross-sectional view taken along line III-III of FIG. 1.
Figure 4:
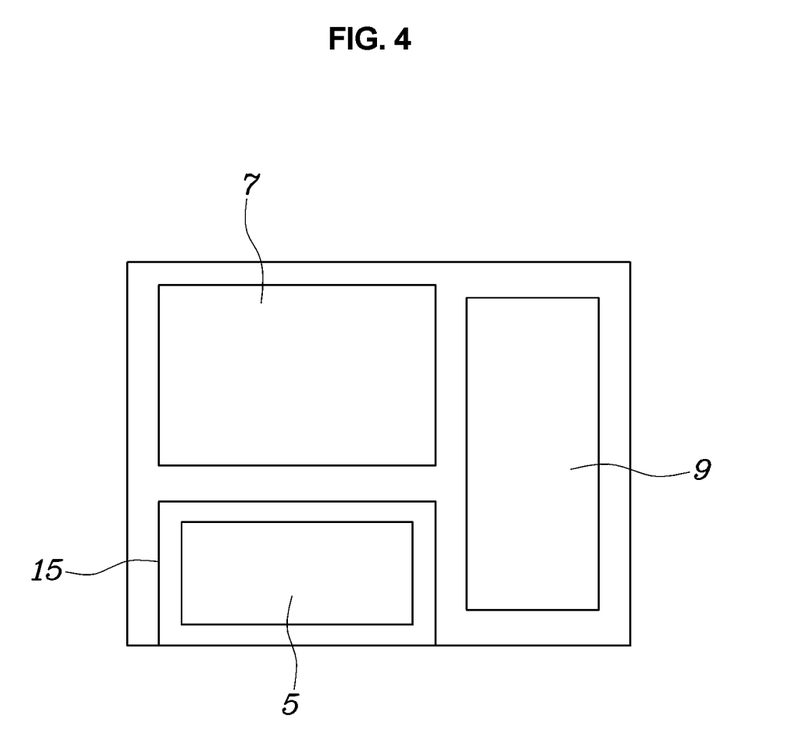
FIG. 4 is a view illustrating an arrangement of components when the battery system of FIG. 1 is viewed from the left side.

In the battery system, an inlet duct 19 is provided above the BMA 1 to introduce air from a lower side of the center of the rear seat 17; an upper duct 23 is provided below the inlet duct 19 and inclined downwardly toward the cooling fan 3 from a duct hole 21, to which the inlet duct 19 is connected, to uniformly supply the introduced air above each battery cell of the BMA 1; and a lower duct 25 is provided below the BMA 1 to guide the air having passed through each battery cell to be directed to the cooling fan 3.

Therefore, once the cooling fan 3 is operated, the air introduced above the BMA 1 through the inlet duct 19 is uniformly distributed by the upper duct 23 to perform the cooling function while passing between the battery cells from an upper side to a lower side of each of the battery cells configuring the BMA 1, and the air is discharged through a discharge duct 27 outside the vehicle body after moving to the cooling fan 3 through the lower duct 25.

As described above, the PRA 7 is installed at a location that is physically blocked from a flow path of the cooling air connected from the inlet duct 19 through the upper duct 23 and the lower duct 25 to the cooling fan 3. Thus, noise generated from the PRA 7 may be prevented from being introduced into the vehicle in a reverse direction along the flow path of the cooling air, thereby improving quietness of the vehicle.

Figure 6:
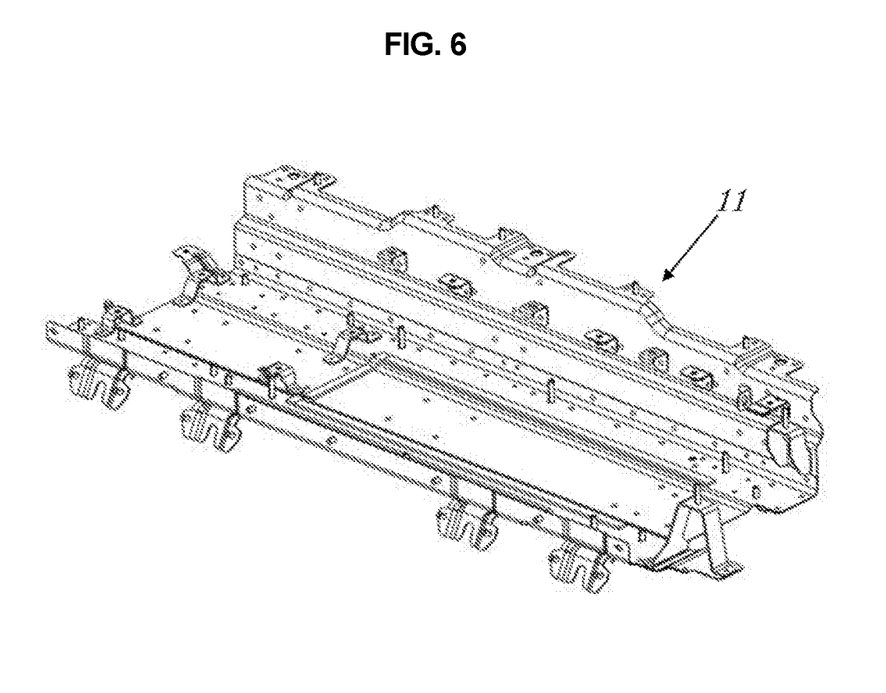
FIG. 6 is a view illustrating a base plate.

In the embodiment, a lower side of the battery system and a rear side of the vehicle body are covered by the base plate 11 as illustrated in FIG. 6, and an upper side of the battery system and a front side of the vehicle body are covered by an upper cover 29 as illustrated in FIG. 7.

In an embodiment where the lower side of the battery system and the rear side of the vehicle body are covered by the base plate 11 and the upper side of the battery system and the front side of the vehicle body are covered by the upper cover 29 as described above, a separate case for covering the battery system is not required, thereby reducing a weight of the vehicle and costs. It is also possible to remove only a necessary part in a situation where a repair is needed.

In particular, in this embodiment, the upper cover 29 includes a first upper cover 29-1 covering the BMA 1, and a second upper cover 29-2 covering the BMS 9 and the PRA 7. In this configuration, for example, in a situation where there is a problem with the PRA 7 or the BMS 9 and a repair is needed, only the second upper cover 29-2 may be removed to carry out the repair.

Meanwhile, in order to fix the above-described battery system to the vehicle, a battery frame 31 fixing the battery system to the vehicle body is installed on an upper side of the upper cover 29.

Substantially, when the above-described battery system is assembled on a vehicle, the battery system may be seated onto the vehicle body in a state where the battery system has a battery frame 31 mounted thereon while automation equipment holds the battery frame 31.

FIGS. 7 and 10 illustrate a state where the battery system with the battery frame 31 mounted thereon is seated under the rear seat of the vehicle body as described above. The battery system is fixed to the vehicle body by fixing all of a front side, a rear side, and both lateral sides of the battery frame 31 to the vehicle body using bolts.

Figure 8:
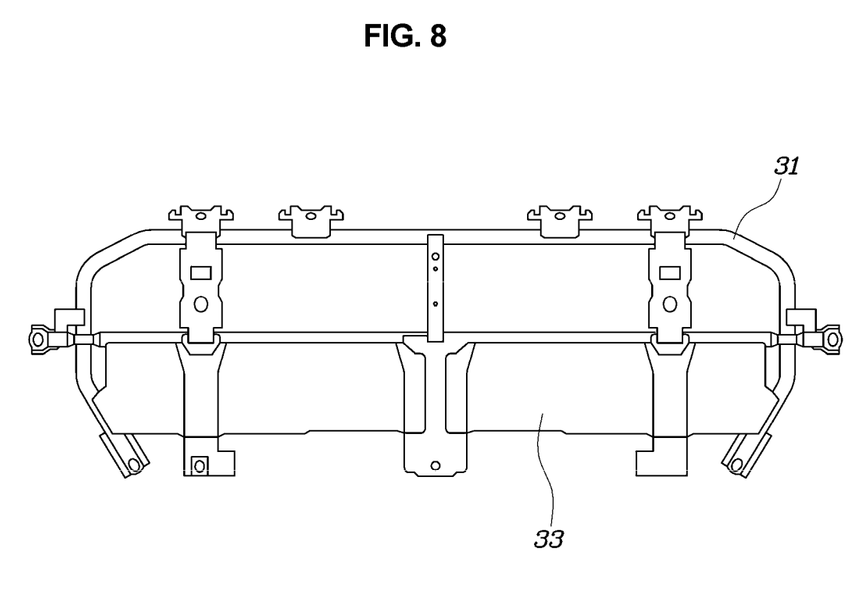
FIG. 8 is a view of a battery frame observed from above.

The battery frame 31 is provided with a battery frame panel 33 at a position for supporting an occupant's buttocks on the rear seat from a lower side thereof, thereby preventing a sub-marine phenomenon of the occupant on the rear seat in the event of a vehicle crash or the like.

The sub-marine phenomenon refers to a phenomenon that an occupant wearing a seat belt "submerges" under the abdominal belt while the seat falls down at the time of a vehicle crash or a sudden stop, and thereby, the occupant's abdomen is tightened by the abdominal belt escaped from the pelvis of the occupant, causing an abdominal injury, such as hernias and enterorrhexis.

Particularly, in the embodiment, the battery frame panel 33 is installed only from the center portion to the rear side of the battery frame 31. This is because the occupant's buttocks may be supported by the battery frame panel 33 unless the occupant sits on an extremely front portion of the rear seat, and furthermore, it is possible to avoid interference with the inlet duct 19 installed to protrude above the first upper cover 29-1 on an upper side of the BMA 1.

Meanwhile, at least one of the bolts for fixing the battery frame 31 to the vehicle body is an earth bolt 13. The earth bolt 13 may be fastened to electrically connect the base plate 11 to the vehicle body.

Figure 2:
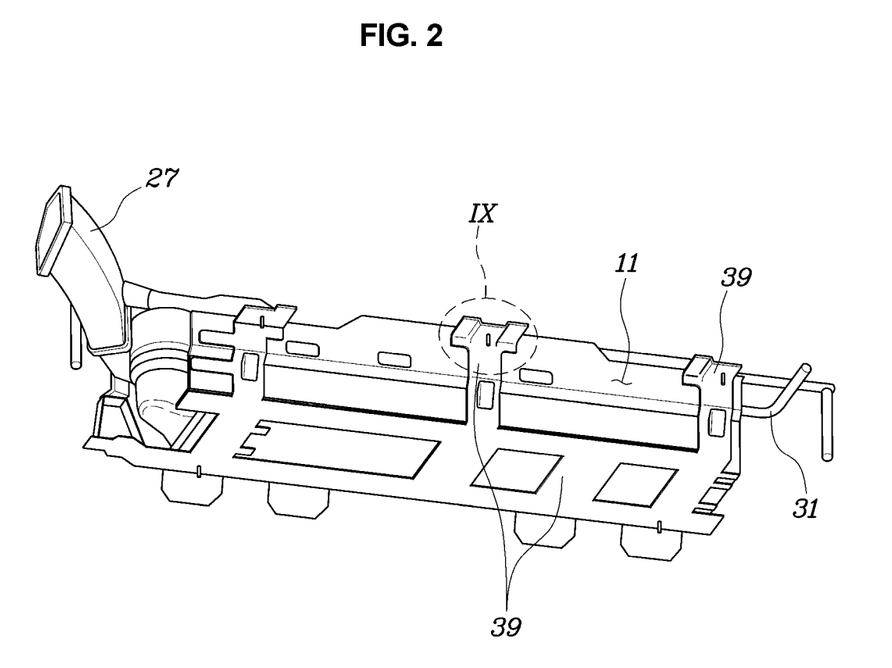
FIG. 2 is a view of the battery system of FIG. 1 when observed in the opposite direction.
Figure 9:
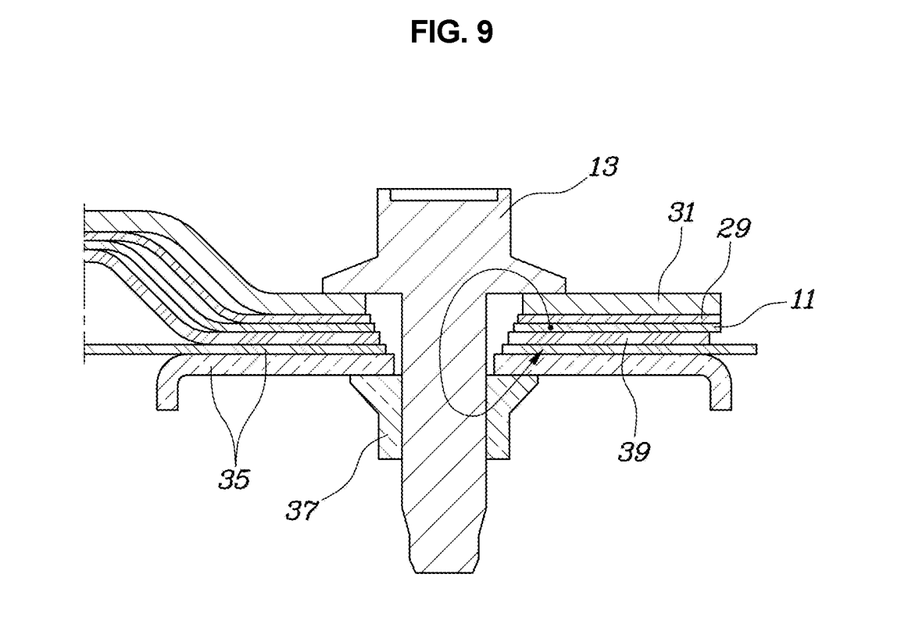
FIG. 9 is a view illustrating a cross section of a portion where the battery frame is fixed to the vehicle body through an earth bolt.

FIG. 9 illustrates a cross section of a portion where the earth bolt 13 is fastened as described above, and may substantially be considered as a cross-sectional view in a state where the portion indicated by IX in FIG. 2 is mounted on the vehicle body.

A weld nut 37 is mounted on a lower side of a vehicle body panel 35 at the portion where the earth bolt 13 is fastened; and a rigidity reinforcing member 39, the base plate 11, the upper cover 29 and the battery frame 31 are sequentially stacked on an upper side of the vehicle body panel 35. The earth bolt 13 is fastened to the weld nut 37 after penetrating sequentially from an upper side of the battery frame 31.

The rigidity reinforcing member 39, which is a component for reinforcing the rigidity of the base plate 11, may be configured to be coupled to an external side of the base plate 11 as illustrated in FIG. 2.

The vehicle body panel 35 and the weld nut 37 are insulated by painting, but once the earth bolt 13 is fastened to the weld nut 37 as described above, the earth bolt 13 is coupled to the weld nut 37 while removing a painting surface of the weld nut 37. As a result, the earth bolt 13 and the vehicle body panel 35 are electrically connected to each other through the weld nut 37.

Therefore, when the ground of the low voltage battery 5 is formed on the base plate 11 as described above, the ground is made ultimately to the vehicle body panel 35 through the base plate 11, the upper cover 29, the battery frame 31, the earth bolt 13, and the weld nut 37 sequentially as indicated by an arrow in FIG. 9.

As a result, it is possible to eliminate a separate process of coupling a ground wire of the low voltage battery 5 to the vehicle body panel 35 later.

The present disclosure having simple and compact configuration is capable of improving spatial efficiency in the vehicle body, reducing necessary material costs and a weight, securing effective and uniform performance in cooling the BMA, preventing introduction of noise into the vehicle through the cooling path, and preventing a submarine phenomenon of the occupant on the rear seat.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:

1. A battery system of a vehicle comprising:
    a battery module assembly (BMA) formed by overlapping a plurality of battery modules along a first direction;
    a cooling fan installed to be aligned along the first direction on one side of the BMA and configured to discharge air cooling the BMA while passing therethrough;
    a low voltage battery installed to be aligned along the first direction on the other side of the BMA;
    a power relay assembly (PRA) aligned along a second direction perpendicular to the first direction and installed adjacent to the low voltage battery; and
    a battery management system (BMS) aligned along a third direction perpendicular to the first direction and the second direction and installed adjacent to the low voltage battery and the PRA.

2. The battery system of a vehicle of claim 1, wherein a PRA mounting bracket is installed between the low voltage battery and the PRA and configured to support the PRA independently of the low voltage battery.

3. The battery system of a vehicle of claim 1, wherein the battery system is mounted under a rear seat of the vehicle, under the following conditions: the first direction is a transverse direction of the vehicle, the second direction is a height direction of the vehicle, and the third direction is a longitudinal direction of the vehicle.

4. The battery system of a vehicle of claim 3, wherein an inlet duct is provided above the BMA to introduce the air from a lower side of the center of the rear seat,
    an upper duct is provided below the inlet duct and inclined downwardly toward the cooling fan from a duct hole, to which the inlet duct is connected, to uniformly supply the introduced air above each battery cell of the BMA, and
    a lower duct is provided below the BMA to guide the air having passed through the each battery cell to be directed to the cooling fan.

5. The battery system of a vehicle of claim 4, wherein the PRA is installed at a location that is physically blocked from a flow path of the cooling air connected from the inlet duct through the upper duct and the lower duct to the cooling fan.

6. The battery system of a vehicle of claim 3, wherein a lower side of the battery system and a rear side of a vehicle body are covered by a base plate, and
    an upper side of the battery system and a front side of the vehicle body are covered by an upper cover.

7. The battery system of a vehicle of claim 6, wherein the upper cover includes a first upper cover covering the BMA, and a second upper cover covering the BMS and the PRA.

8. A structure for fixing the battery system of claim 6 to a vehicle, the structure comprising:
    a battery frame installed on an upper side of the upper cover to fix the battery system to the vehicle body; and
    a battery frame panel provided with the battery frame at a position for supporting an occupant's buttocks on the rear seat from a lower side thereof.

9. The structure of claim 8, wherein the battery frame panel is installed only from a center portion to a rear side of the battery frame.

10. The structure of claim 8, wherein at least one bolt for fixing the battery frame to the vehicle body is an earth bolt, and the earth bolt is fastened to electrically connect the base plate to the vehicle body.

11. The structure of claim 10, wherein a weld nut is mounted on a lower side of a vehicle body panel at a portion where the earth bolt is fastened, and a rigidity reinforcing member, the base plate, the upper cover and the battery frame are sequentially stacked on an upper side of the vehicle body panel, and the earth bolt is fastened to the weld nut after penetrating sequentially from an upper side of the battery frame.

\* \* \* \* \*